US007475014B2

(12) United States Patent
Smaragdis et al.

(10) Patent No.: US 7,475,014 B2
(45) Date of Patent: Jan. 6, 2009

(54) METHOD AND SYSTEM FOR TRACKING SIGNAL SOURCES WITH WRAPPED-PHASE HIDDEN MARKOV MODELS

(75) Inventors: Paris Smaragdis, Brookline, MA (US); Petros Boufounos, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 583 days.

(21) Appl. No.: 11/188,896

(22) Filed: Jul. 25, 2005

(65) Prior Publication Data

US 2007/0033045 A1 Feb. 8, 2007

(51) Int. Cl.

| | |
|---|---|
| ***G06G 7/12*** | (2006.01) |
| ***G10L 11/00*** | (2006.01) |
| ***G10L 15/14*** | (2006.01) |
| ***G10L 17/00*** | (2006.01) |
| ***H04R 3/00*** | (2006.01) |
| ***H04R 5/00*** | (2006.01) |

(52) U.S. Cl. .......................... 704/250; 381/17; 381/92; 708/815; 704/200; 704/256.2

(58) Field of Classification Search ................ 704/200, 704/230, 231, 236, 245, 247, 252, 256, 270, 704/250; 342/13, 159, 194, 195, 357, 359, 342/463, 465; 348/169; 381/17, 92; 382/103, 382/118, 218, 228; 708/815

See application file for complete search history.

(56) References Cited

U.S. PATENT DOCUMENTS 5,890,114 A * 3/1999 Yi .............................. 704/256
6,480,825 B1 * 11/2002 Sharma et al. .............. 704/270
6,539,351 B1 * 3/2003 Chen et al. .................. 704/236
6,629,073 B1 * 9/2003 Hon et al. ................ 704/256.4
6,674,403 B2 * 1/2004 Gray et al. .................. 342/463
6,731,240 B2 * 5/2004 Dybdal et al. ............... 342/359
6,940,540 B2 * 9/2005 Beal et al. ................... 348/169
2001/0044719 A1 * 11/2001 Casey ......................... 704/245
2003/0085831 A1 * 5/2003 Lavoie ........................ 342/13

(Continued)

FOREIGN PATENT DOCUMENTS

EP 1116961 B1 * 8/2005

(Continued)

OTHER PUBLICATIONS

Tso et al., "Demonstrated Trajectory Selection by Hidden Markov Model", IEEE International Conference on Robotics and Automation, 1997. Proceedings., Apr. 20-25, 1997, 2713-2718 vol. 3.*

(Continued)

*Primary Examiner*—David R Hudspeth
*Assistant Examiner*—Justin W Rider
(74) *Attorney, Agent, or Firm*—Dirk Brinkman; Gene Vinokur

(57) ABSTRACT

A method models trajectories of a signal source. Training signals generated by a signal source moving along known trajectories are acquired by each sensor in an array of sensors. Phase differences between all unique pairs of the training signals are determined. A wrapped-phase hidden Markov model is constructed from the phase differences. The wrapped-phase hidden Markov model includes multiple Gaussian distributions to model the known trajectories of the signal source.

16 Claims, 8 Drawing Sheets

U.S. PATENT DOCUMENTS

| | | | | |
|---|---|---|---|---|
| 2005/0281410 | A1* | 12/2005 | Grosvenor et al. | 381/61 |
| 2005/0288911 | A1* | 12/2005 | Porikli | 703/2 |
| 2006/0245601 | A1* | 11/2006 | Michaud et al. | 381/92 |

FOREIGN PATENT DOCUMENTS

| | | | |
|---|---|---|---|
| EP | 1693826 | B1 * | 8/2007 |

OTHER PUBLICATIONS

Vermaak et al., "Nonlinear Filtering for Speaker Tracking in Noisy and Reverberant Environments", IEEE International Conference on Acoustics, SPeech, and Signal Processing, 2001. Proceedings. (ICASSP '01), May 7-11, 2001, 3021-3024 vol. 5.*

M.S. Brandstein, J.E. Adcock, and H.F. Silverman, A practical time delay estimator for localizing speech sources with a microphone array, Computer Speech and Language, vol. 9, pp. 153169, Apr. 1995.

S.T. Birtchfield and D.K. Gillmor, "Fast Bayesian acoustic localization", in the proceedings of the International Conference on Acoustics, Speech and Signal Processing (ICASSP), 2002.

G. Arslan, F.A. Sakarya, and B.L. Evans, "Speaker Localization for Far-field and Near-field Wideband Sources Using Neural Networks", IEEE Workshop on Nonlinear Signal and Image Processing, 1999.

J. Weng and K. Y. Guentchev, "Three-dimensional sound localization from a compact noncoplanar array of microphones using tree-based learning," Journal of the Acoustic Society of America, vol. 110, No. 1, pp. 310-323, Jul. 2001.

Rabiner, L.R. A tutorial on hidden markov models and selected applications in speech recognition. Proceedings of the IEEE, 1989.

Juang, B.H. and L.R. Rabiner. "A probabilistic distance measure for hidden Markov models", AT&T Technical Journal, vol. 64 No. 2, Feb. 1985.

* cited by examiner

METHOD AND SYSTEM FOR TRACKING SIGNAL SOURCES WITH WRAPPED-PHASE HIDDEN MARKOV MODELS

FIELD OF THE INVENTION

This invention relates generally to processing signals, and more particularly to tracking sources of signals.

BACKGROUND OF THE INVENTION

Moving acoustic sources can be tracked by acquiring and analyzing their acoustic signals. If an array of microphones is used, the methods are typically based on beam-forming, time-delay estimation, or probabilistic modeling. With beam-forming, time-shifted signals are summed to determine source locations according to measured delays. Unfortunately, beam-forming methods are computationally complex. Time-delay estimation attempts to correlate signals to determine peaks. However, such methods are not suitable for reverberant environments. Probabilistic methods typically use Bayesian networks, M. S. Brandstein, J. E. Adcock, and H. F. Silverman, "A practical time delay estimator for localizing speech sources with a microphone array," Computer Speech and Language, vol. 9, pp. 153-169, April 1995; S. T. Birtchfield and D. K. Gillmor, "Fast Bayesian acoustic localization," Proceedings of the International Conference on Acoustics, Speech and Signal Processing (ICASSP), 2002; and T. Pham and B. Sadler, "Aeroacoustic wideband array processing for detection and tracking of ground vehicles," J. Acoust. Soc. Am. 98, No. 5, pt. 2, 2969, 1995.

One method involves 'black box' training of cross-spectra, G. Arslan, F. A. Sakarya, and B. L. Evans, "Speaker Localization for Far-field and Near-field Wideband Sources Using Neural Networks," IEEE Workshop on Non-linear Signal and Image Processing, 1999. Another method models cross-sensor differences, J. Weng and K. Y. Guentchev, "Three-dimensional sound localization from a compact non-coplanar array of microphones using tree-based learning," Journal of the Acoustic Society of America, vol. 110, no. 1, pp. 310 - 323, July 2001.

There are a number of problems with tracking moving signal sources. Typically, the signals are non-stationary due to the movement. There can also be significant time-varying multi-path interference, particularly in highly-reflective environments. It is desired to track a variety of different signal sources in different environments.

SUMMARY OF THE INVENTION

A method models trajectories of a signal source. Training signals generated by a signal source moving along known trajectories are acquired by each sensor in an array of sensors. Phase differences between all unique pairs of the training signals are determined. A wrapped-phase hidden Markov model is constructed from the phase difference. The wrapped-phase hidden Markov model includes multiple Gaussian distributions to model the known trajectories of the signal source.

Test signals generated by the signal source moving along an unknown trajectory are subsequently acquired by the array of sensors. Phase differences between all pairs of the test signals are determined. Then, a likelihood that the unknown trajectory is similar to one of the known trajectories is determined according to the wrapped-phase hidden Markov model and the phase differences of the test signal.

DETAILED DESCRIPTION OF THE PREFERRED EMBODIMENT

Model Construction

Figure 1:
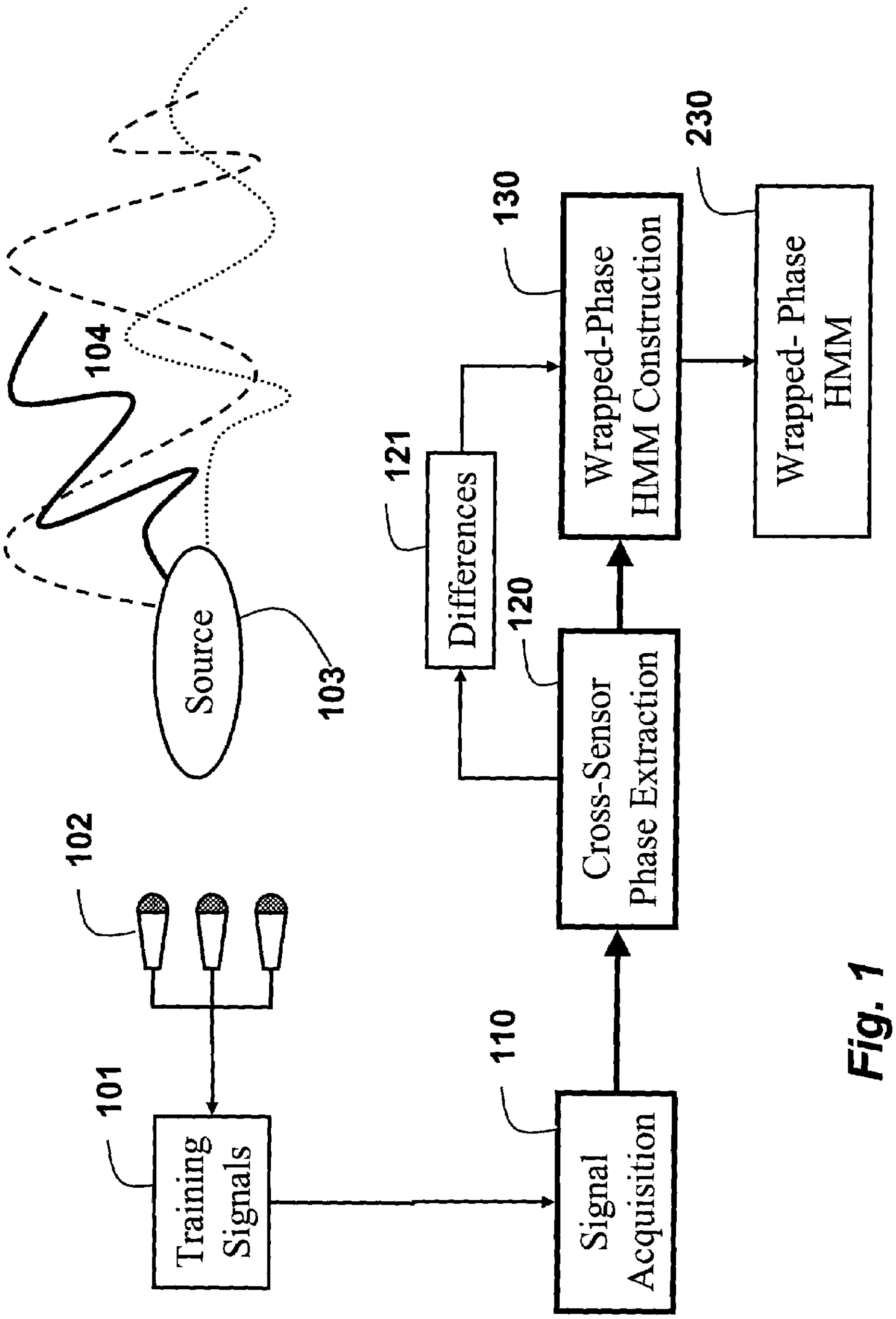
FIG. 1 is a block diagram of a system and method for training a hidden Markov model from an acquired wrapped-phase signal according to one embodiment of the invention.

As shown in FIG. 1, a method and system acquire 110 training signals 101, via an array of sensors 102, from a signal source 103 moving along known trajectories 104. In one embodiment of the invention, the signals are acoustic signals, and the sensors are microphones. In another embodiment of the invention, the signals are electromagnetic frequency signals, and the sensors are, e.g., antennas. In any case, the signals exhibit phase differences at the sensors according to their position. The invention determines differences in the phases of the signals acquired by each unique pair of sensors.

Cross-sensor phase extraction 120 is applied to all unique pairs of the training signals 101. For example, if there are three sensors A, B and C, the pairs of training signals would be A-B, A-C, B-C. Phase differences 121 between the pairs of training signals are then used to construct 130 a wrapped-phase hidden Markov model (HMM) 230 for the trajectories of the signal sources. The wrapped-phase HMM includes multiple wrapped-phase Gaussian distributions. The distributions are 'wrapped-phase' because the distributions are replicated at phase intervals of $2\pi$.

Tracking

Figure 2:
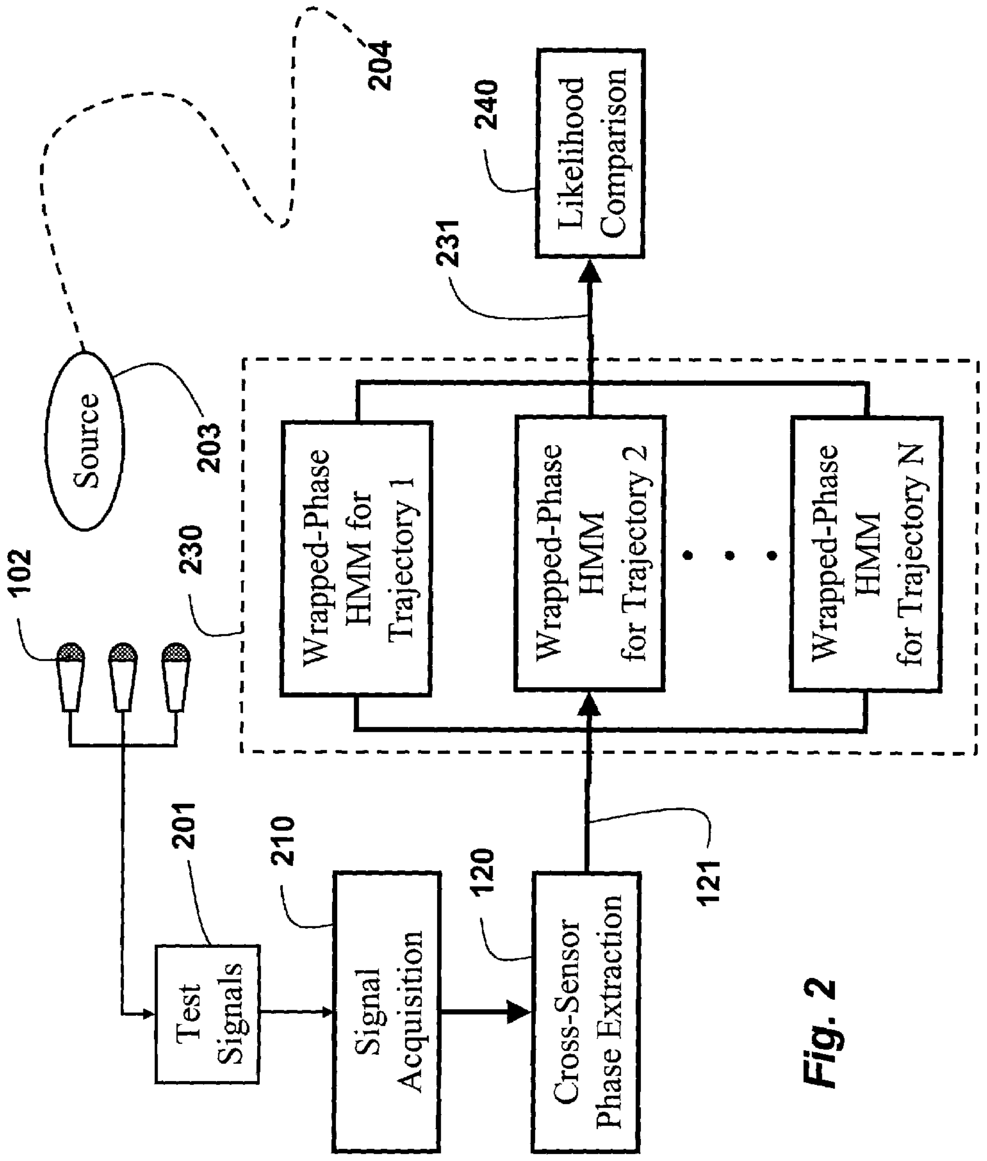
FIG. 2 is a block diagram of a method for tracking a signal source using the hidden Markov model of FIG. 1 and an acquired wrapped-phase signal according to one embodiment of the invention.

FIG. 2 shows a method that uses the wrapped-phase HMM model 230 to track the signal source according to one embodiment of the invention. Test signals 201 are acquired 210 of the signal source 203 moving along an unknown trajectory 204. Cross-sensor phase extraction 120 is applied to all pairs of the test signals, as before. The extracted phase differences 121 between the pairs of test signals are used to determine likelihood scores 231 according to the model 230. Then, the likelihood scores can be compared 240 to determine if the unknown trajectory 204 is similar to one of the known trajectories 104.

Wrapped-Phase Model

One embodiment of our invention constructs 130 the statistical model 230 for wrapped-phases and wrapped-phase time series acoustic training signals 101 acquired 110 by the array of microphones 102. We describe both univariate and multivariate embodiments. We assume that a phase of the acoustic signals is wrapped in an interval $[0, 2\pi)$, a half-closed interval.

Univariate Model

A single Gaussian distribution could be used for modeling trajectories of acoustic sources. However, if the phase is modeled with one Gaussian distribution, and a mean of the data is approximately 0 or 2π, then the distribution is wrapped and becomes bimodal. In this case, the Gaussian distribution model can misrepresent the data.

Figure 3:
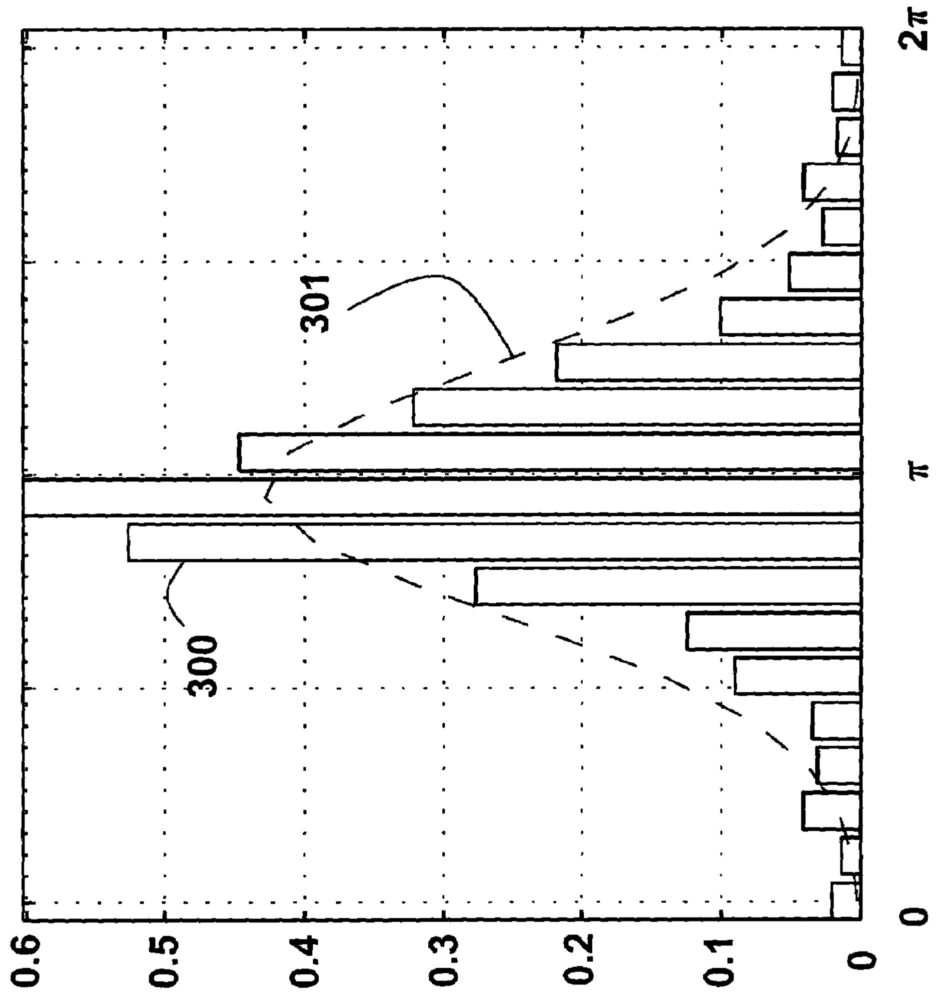
FIG. 3 is a histogram of acoustic phase difference data acquired by two microphones.

FIG. 3 is a histogram 300 of acoustic phase data. The phase data are phase differences for specific frequencies of an acoustic signal acquired by two microphones. The histogram can be modeled adequately by a single Gaussian distribution 301.

Figure 4:
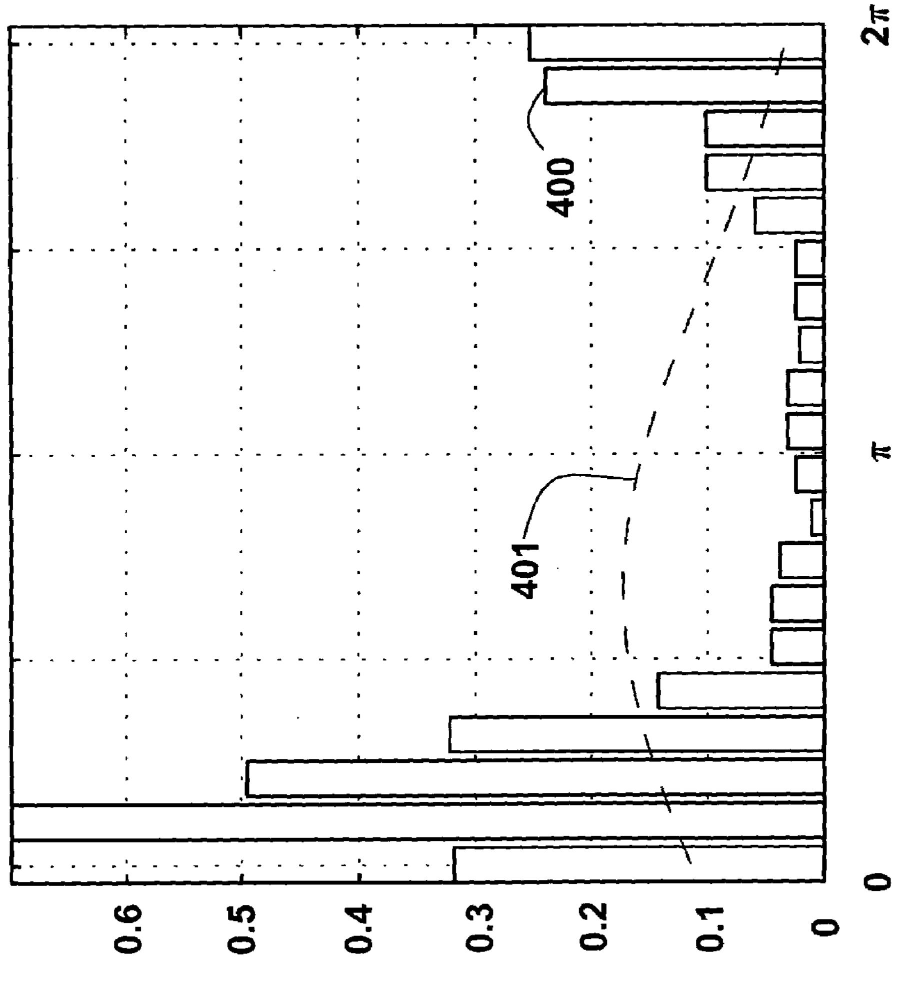
FIG. 4 is a histogram of acoustic data exhibiting phase wrapping.

FIG. 4 is a histogram 400 of acoustic data that exhibits phase wrapping. Because the phase data are bimodal, the fitted Gaussian distribution 401 does not adequately model the data.

In order to deal with this problem, we define the wrapped-phase HMM to explicitly model phase wrapping. We model phase data x, in an unwrapped form, with a Gaussian distribution having a mean μ and a standard deviation σ. We emulate the phase wrapping process by replicating the Gaussian distribution at intervals of 2π to generate k distributions according to:

$$f_x(x) = \begin{cases} \sum_{k=-\infty}^{+\infty} \frac{1}{\sqrt{2\pi\sigma^2}} e^{-\frac{(x+k2\pi-\mu)^2}{2\sigma^2}} & \text{if } x \in [0, 2\pi) \\ 0 & \text{otherwise} \end{cases} \quad (1)$$

to construct the univariate model $f_x(x)$ 230.

Tails of the replicated Gaussian distributions outside the interval [0, 2π) account for the wrapped data.

Figure 5:
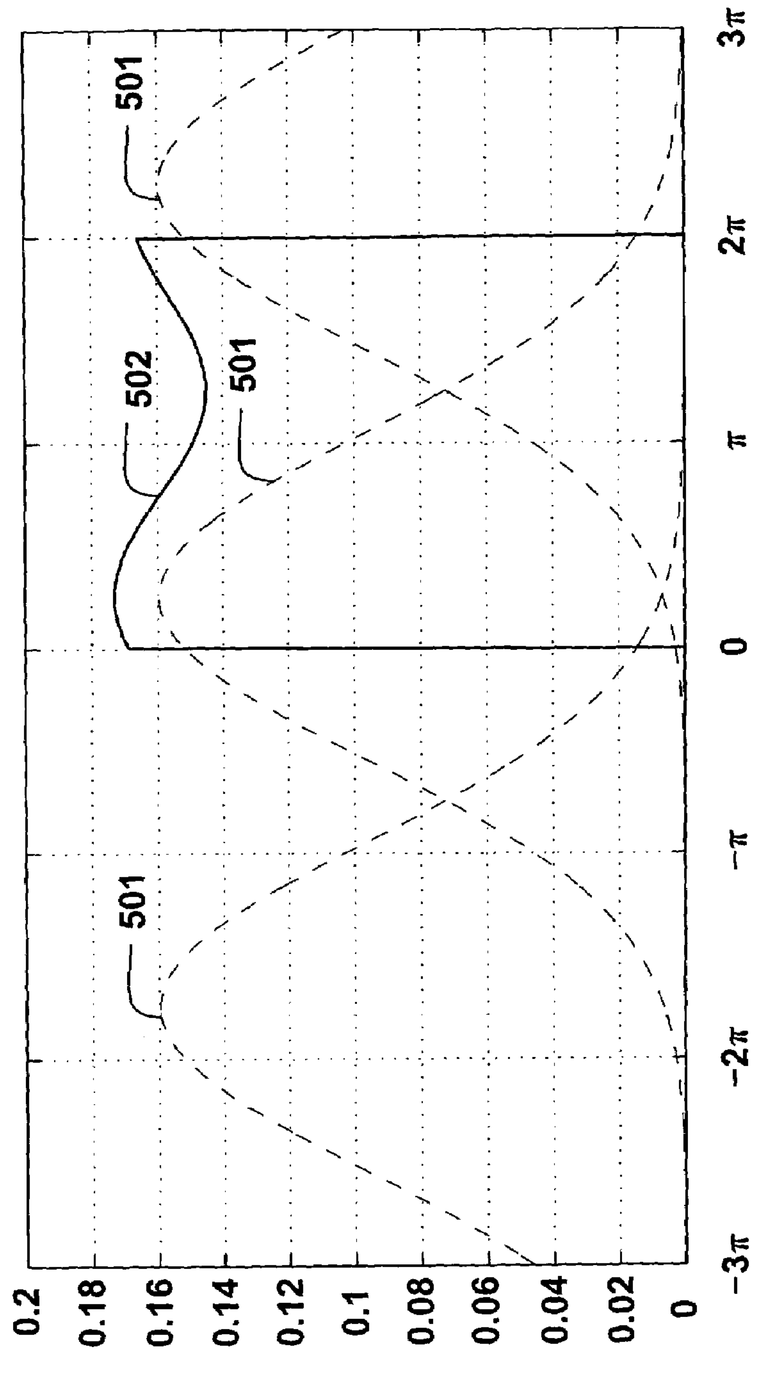
FIG. 5 is a graph of wrapped-phase Gaussian distributions.

FIG. 5 shows Gaussian distributed phases with a mean μ=0.8, and a standard deviation of σ=2.5. The dotted lines 501 represent some of the replicated Gaussian distributions used in Equation 1. The solid line 502, defined over an interval [0, 2π) is a sum of the Gaussian distributed phases according to Equation 1, and the resulting wrapped-phase distribution.

The central Gaussian distribution that is negative and wrapped approximately around 2π is accounted for by the right-most Gaussian distribution and a smaller wrapped amount greater than 2π is represented by the left-most distribution.

An effect of consecutive wrappings of the acquired time series data can be represented by Gaussian distributions placed at multiples of 2π.

We provide a method to determine optimal parameters of the Gaussian distributions to model the wrapped-phase training signals 101 acquired by the array of sensors 102.

We use a modified expectation-maximization (EM) process. A general EM process is described by A. P. Dempster, N. M. Laird, and D. B. Rubin, "Maximum Likelihood from Incomplete Data via the EM Algorithm," Journal of Royal Statistical Society B, vol. 39, no. 1, pp. 1-38, 1977.

We start with a wrapped-phase data set $x_i$ defined in an interval [0, 2π), and initial Gaussian distribution parameter values expressed by the mean μ and the standard deviation σ.

In the expectation step, we determine a probability that a particular sample x is modeled by a $k^{th}$ Gaussian distribution of our model 230 according to:

$$P_{x,k} = \frac{\frac{1}{\sqrt{2\pi\sigma^2}} e^{-\frac{(x+k2\pi-\mu)^2}{2\sigma^2}}}{f_x(x)} \quad (2)$$

Using a probability $P_{x,k}$ as a weighting factor, we perform the maximization step and estimate the mean μ and the variance $\sigma^2$ according to:

$$\mu = \left\langle \sum_{k=-\infty}^{+\infty} P_{x,k}(x + k2\pi) \right\rangle \quad (3)$$

$$\sigma^2 = \left\langle \sum_{k=-\infty}^{+\infty} P_{x,k}(x + k2\pi - \mu)^2 \right\rangle \quad (4)$$

where <·> represents the expectation. Any solution of the form μ+c2π, where an offset c ∈ Z, is equivalent.

For a practical implementation, summation of an infinite number of Gaussian distributions is an issue. If k ∈ −1, 0, 1, that is three Gaussian distributions, then we obtain good results. Similar results can be obtained for five distributions, i.e., k ∈ −2, −1, 0, 1, 2. The reason to use large values of k is to account for multiple wraps. However, cases where we have more than three consecutive wraps in our data are due to a large variance. In these cases, the data becomes essentially uniform in the defined interval of [0, 2π).

These cases can be adequately modeled by a large standard deviation σ, and replicated Gaussian distributions. This negatives the need for excessive summations over k. We prefer to use k ∈ −1, 0, 1.

However, the truncation of k increases the complexity of estimating the mean μ. As described above, the mean μ is estimated with an arbitrary offset of c2π, c ∈ Z. If k is truncated and there are a finite number of Gaussian distributions, then it is best to ensure that we have the same number of distributions on each side of the mean μ to represent the wrappings equally on both sides. To ensure this, we make sure that the mean μ ∈ [0, 2π) by wrapping the estimate we obtain from Equation 3.

Multivariate and HMM Extensions

We can use the univariate model $f_x(x)$ 230 as a basis for a multivariate, wrapped-phase HMM. First, we define the multivariate model. We do so by taking a product of the univariate model for each dimension i:

$$f_x(x) = \prod_i f_x(x_i). \quad (5)$$

This corresponds essentially to a diagonal covariance wrapped Gaussian model. A more complete definition is possible by accounting for the full interactions between the variates resulting in a full covariance equivalent.

In this case, the parameters that are estimated are the means $\mu_i$ and the variances $\sigma_i$, for each dimension i. Estimation of the parameters can be done by performing the above described EM process one dimension at a time.

Then, the parameters are used for a state model inside the hidden Markov model (HMM). We adapt a Baum-Welch process to train the HMM that has k wrapped-phase Gaussian distributions as a state model, see generally L. R. Rabiner, "A tutorial on hidden Markov models and selected applications in speech recognition," Proceedings of the IEEE, 1989.

Unlike the conventional HMM, we determine a posteriori probabilities of the wrapped-phase Gaussian distribution-based state model. The state model parameter estimation in the maximization step is defined as:

$$\mu_{i,j} = \left\langle \sum_{k=-\infty}^{+\infty} \gamma_{j,x_i} P_{x_i,k}(x_i + k2\pi) \right\rangle \Big/ \sum_{\forall x_i} \gamma_{j,x_i} \tag{6}$$

$$\sigma_{i,j}^2 = \left\langle \sum_{k=-\infty}^{+\infty} \gamma_{j,x_i} P_{x_i,k}(x_i + k2\pi - \mu_j)^2 \right\rangle \Big/ \sum_{\forall x_i} \gamma_{j,x_i} \tag{7}$$

where $\gamma$ is the posterior probabilities for each state index j and dimension index i. The results are obtained in a logarithmic probability domain to avoid numerical underflows. For the first few training iterations, all variances $\sigma^2$ are set to small values to allow all the means $\mu$ to converge towards a correct solution. This is because there are strong local optima near 0 and $2\pi$, corresponding to a relatively large variance $\sigma^2$. Allowing the mean $\mu$ to converge first is a simple way to avoid this problem.

Training the Model with Trajectories of Signal Sources

The model 230 for the time series of multi-dimensional wrapped-phase data can be used to track signal sources. We measure a phase difference for each frequency of a signal acquired by two sensors. Therefore, we perform a short time Fourier transform on the signals ($F_1(\omega, t)$ and $F_2(\omega, t)$), and determine the relative phase according to:

$$\Phi(\omega, t) = \angle \frac{F_1(\omega, t)}{F_2(\omega, t)} \tag{8}$$

Each time instance of the relative phase $\Phi$ is used as a sample point. Subject to symmetry ambiguities, most positions around the two sensors exhibit a unique phase pattern. Moving the signal source generates a time series of such phase patterns, which are modeled as described above.

To avoid errors due to noise, we only use the phase of frequencies in a predetermined frequency range of interest. For example, for speech signals the frequency range is restricted to 400-8000 Hz. It should be understood that other frequency ranges are possible, such frequencies of signals emitted by sonar, ultrasound, radio, radar, infrared, visible light, ultraviolet, x-rays, and gamma ray sources.

Synthetic Results

We use a source-image room model to generate the known trajectories for acoustic sources inside a synthetic room, see J. B. Allen and D. A. Berkley, "Image method for efficiently simulating small-room acoustics," JASA Vol. 65, pages 943-950, 1979. The room is two-dimensional (10 m×10 m). We use up to third-order reflections, and a sound absorption coefficient of 0.1. Two cardioid virtual microphones are positioned near the center of the room pointing in opposite directions. Our acoustic source generates white noise sampled at 44.1 KHz.

Figure 6:
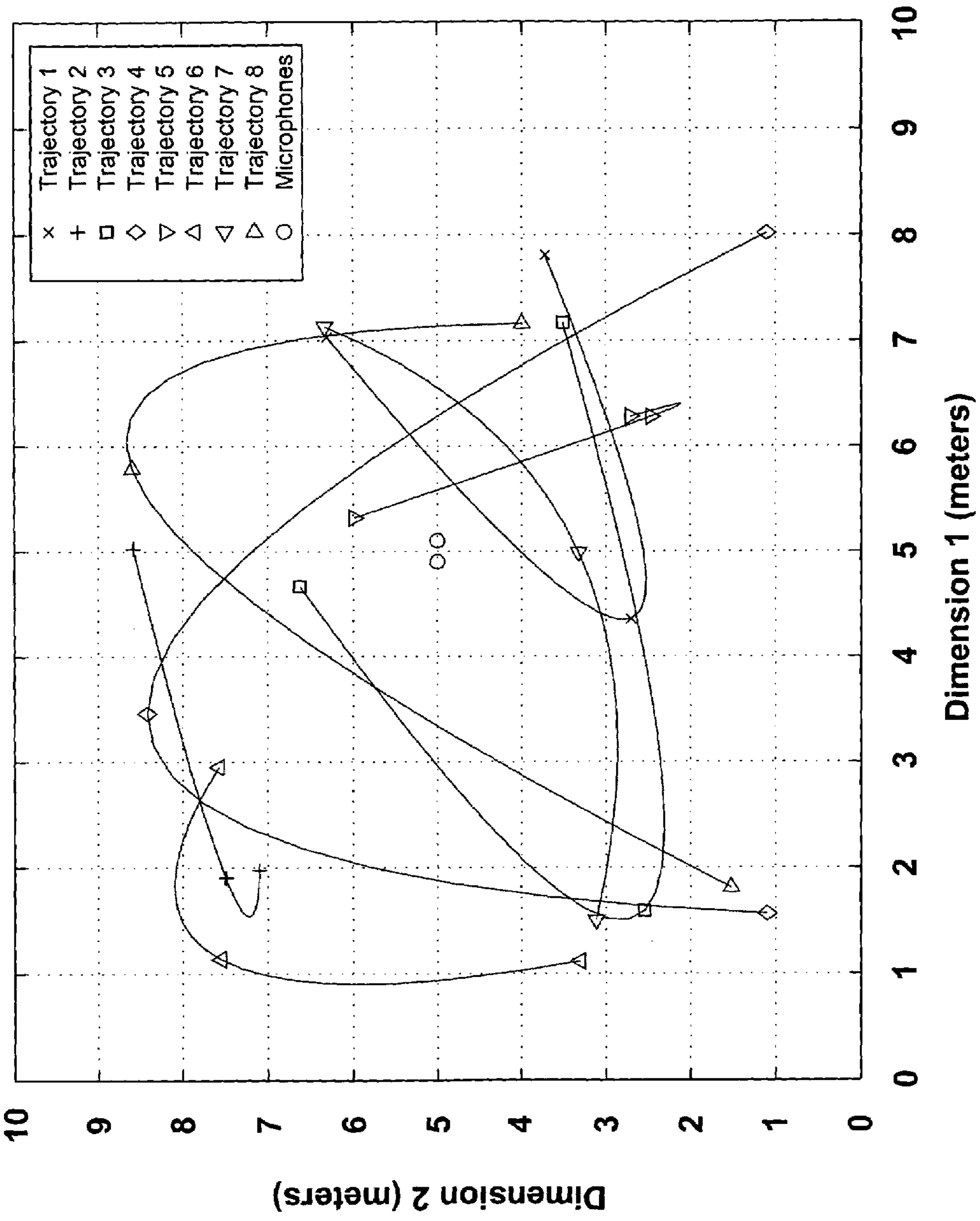
FIG. 6 is a schematic of acoustic source trajectories and microphones.

As shown in FIG. 6, we determine randomly eight smooth known trajectories. For each trajectory, we generate nine similar copies of the known trajectories deviating from the original known trajectories with a standard deviation of about 25 cm. For each trajectory, we used eight of the copies for training the model. Then, the likelihood 231 of the ninth copy is evaluated over the model 230 and compared 240 to the known trajectories.

We train two models, a conventional Gaussian state HMM and the wrapped-phase Gaussian state HMM 230, as described above. For both models, we train on eight copies of each of the eight known trajectories for thirty iterations and use an eight state left-to-right HMM.

Figure 7:
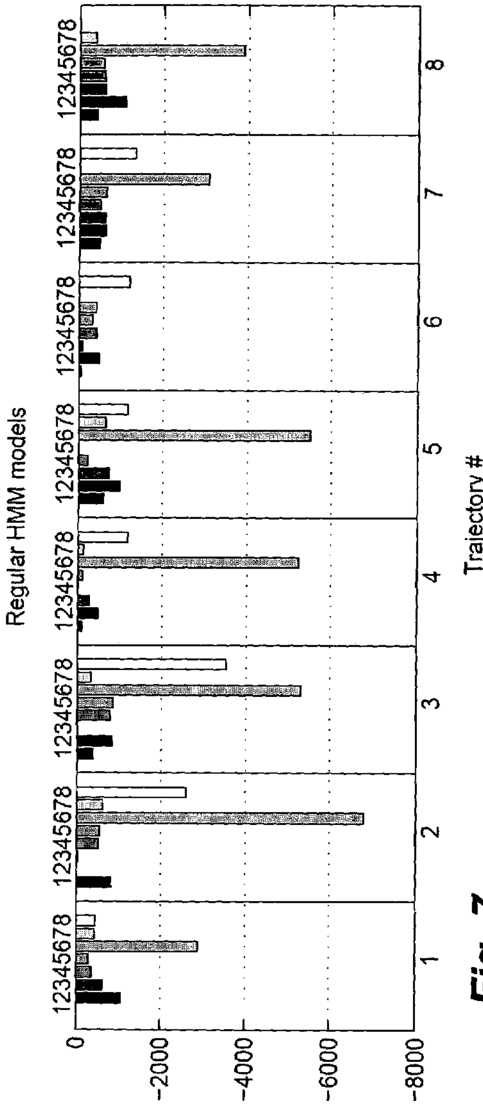
FIGS. 7 and 8 compare results obtained with a conventional model and a wrapped-phase model for synthetic signal sources.
Figure 8:
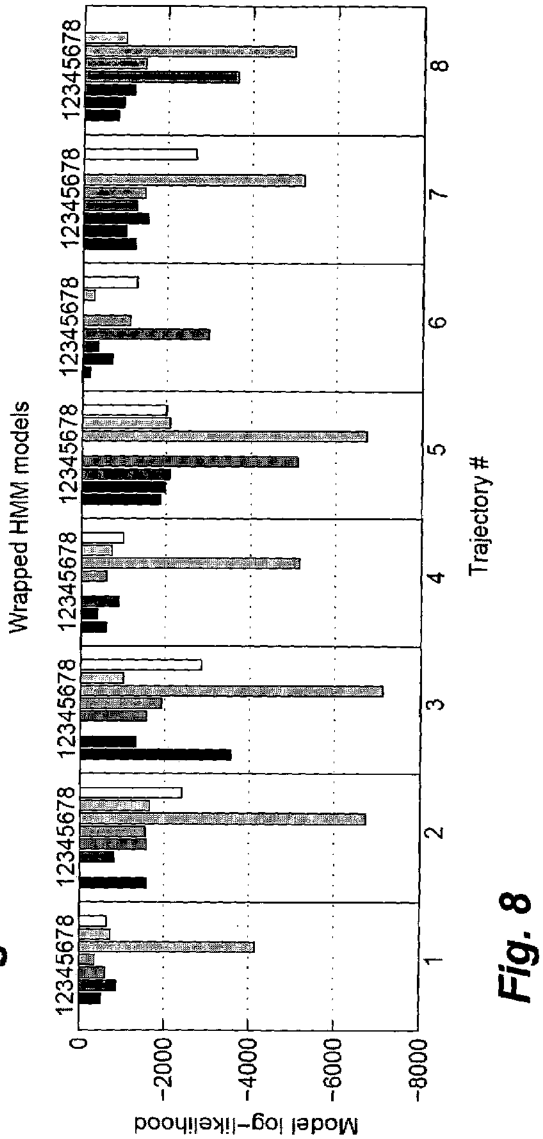

After training the models, we evaluate likelihoods of the log trajectories for the conventional HMM, as shown in FIG. 7, and the wrapped-phase Gaussian HMM, as shown in FIG. 8.

The groups of vertical bars indicate likelihoods for each of the unknown trajectories over all trajectory models. The likelihoods are normalized over the groups so that the more likely model exhibits a likelihood of zero. As shown in FIG. 8, the wrapped-phase Gaussian HMMs 230 always have the most likely model corresponding to the trajectory type, which means that all the unknown trajectories are correctly assigned. This is not the case for the conventional HMM as shown in FIG. 7, which makes classification mistakes due to an inability to model phase accurately. In addition, the wrapped-phase Gaussian HMM provides a statistically more confident classification than the conventional HMM, evident by the larger separation of likelihoods obtained from the correct and incorrect models.

Real Results

Stereo recordings of moving acoustic sources are obtained in a 3.80 m×2.90 m×2.60 m room. The room includes highly reflective surfaces in the form of two glass windows and a whiteboard. Ambient noise is about −12 dB. The recordings were made using a Technics RP-3280E dummy head binaural recording device. We obtain distinct known trajectories using a shaker, producing wide-band noise, and again with speech. We use the shaker recordings to train our trajectory model 230, and the speech recordings to evaluate an accuracy of the classification. As described above, we use a 44.1 KHz sampling rate, and cross-microphone phase measurements of frequencies from 400 Hz to 8000 Hz.

Figure 9:
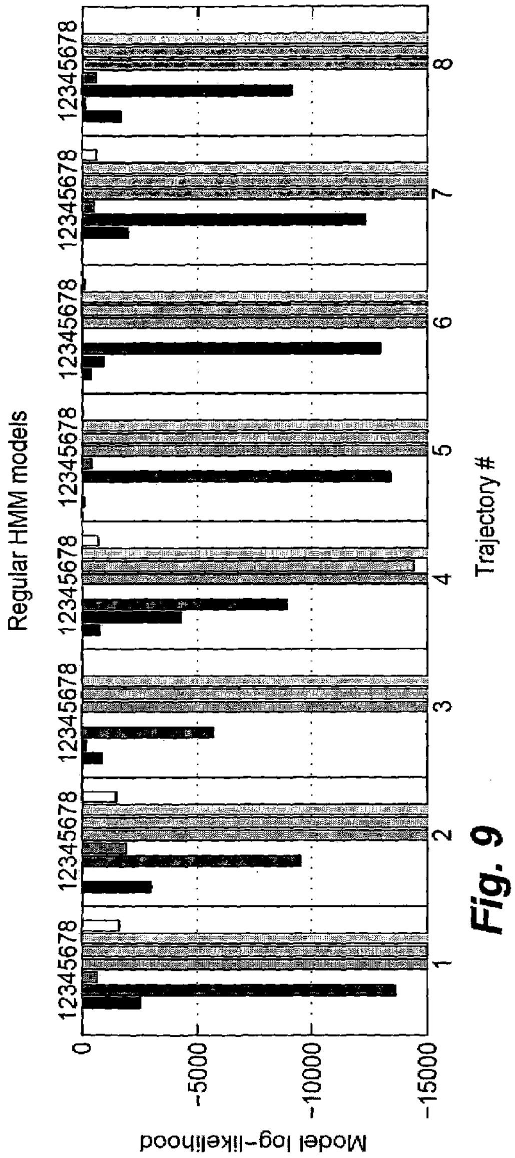
FIGS. 9 and 10 compare results obtained with a conventional model and a wrapped-phase model for real signal sources.
Figure 10:
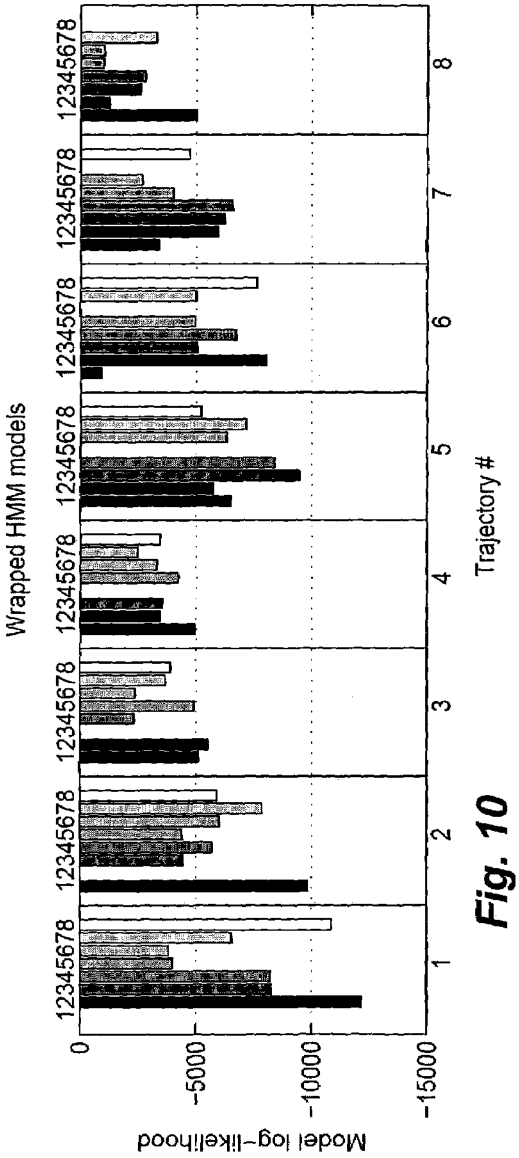

FIGS. 9 and 10 show the results for the conventional and wrapped-phase Gaussian HMMs, respectively. The wrapped Gaussian HMM classifies the trajectory accurately, whereas the conventional HMM is hindered by poor data fitting.

Unsupervised Trajectory Clustering

As described above, the training of the model is supervised, see generally B. H. Juang and L. R. Rabiner, "A probabilistic distance measure for hidden Markov models," AT&T Technical Journal, vol. 64 no. 2, February 1985. However, the method can also be trained using k-means clustering. In this case, the HMM likelihoods are distances. We can cluster the 72 known trajectories described above into eight clusters with the proper trajectories in each cluster using the wrapped-phase Gaussian HMM. It is not possible to cluster the trajectories with the conventional HMM.

EFFECT OF THE INVENTION

A method generates a statistical model for multi-dimensional wrapped-phase time series signals acquired by an array of sensors. The model can effectively classify and cluster trajectories of a signal source from signals acquired with the array of sensors. Because our model is trained for phase responses that describe entire environments, and not just sensor relationships, we are able to discern source locations which are not discernible using conventional techniques.

Because the phase measurements are also shaped by relative positions of reflective surfaces and the sensors, it is less likely to have ambiguous symmetric configurations than often is seen with TDOA based localization.

In addition to avoiding symmetry ambiguities, the model is also resistant to noise. When the same type of noise is present during training as during classifying, the model is trained for any phase disruption effects, assuming the effects do not dominate.

The model can be extended to multiple microphones. In addition, amplitude differences, as well as phase differences, between two microphones can also be considered when the model is expressed in a complex number domain. Here, the real part is modeled with a conventional HMM, and the imaginary part with a wrapped Gaussian HMM. We use this model on the logarithm of the ratio of the spectra of the two signals. The real part is the logarithmic ratio of the signal energies, and the imaginary part is the cross-phase. That way, we model concurrently both the amplitude and phase differences. With an appropriate microphone array, we can discriminate acoustic sources in a three dimensional space using only two microphones.

We can also perform frequency band selection to make the model more accurate. As described above, we use wide-band training signals, which are adequately trained for all the frequencies. However, in cases where the training signal is not 'white', we can select frequency bands where both the training and test signals have the most energy, and evaluate the phase model for those frequencies.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for modeling trajectories of a signal source, comprising:

acquiring, for each sensor in an array of sensors, training signals generated by a signal source moving along a plurality of known trajectories;

determining phase differences between all unique pairs of the training signals; and constructing a wrapped-phase hidden Markov model from the phase differences, the wrapped-phase hidden Markov model including a plurality of Gaussian distributions to model the plurality of known trajectories of the signal source.

2. The method of claim 1, further comprising:

acquiring, for each sensor in the array of sensors, test signals generated by the signal source moving along an unknown trajectory;

determining phase differences between all pairs of test signals; and determining, according to the wrapped-phase hidden Markov model and the phase differences of the test signal, a likelihood that the unknown trajectory is similar to one of the plurality of known trajectories.

3. The method of claim 1, in which the signal source generates an acoustic signal.

4. The method of claim 1, in which the signal source generates an electromagnetic signal.

5. The method of claim 1, in which the plurality of Gaussian distributions are replicated at k phase intervals of $2\pi$.

6. The method of claim 1, further comprising:

summing the plurality of Gaussian distributions.

7. The method of claim 1, further comprising:

determining parameters of the plurality of Gaussian distributions with an expectation-maximization process.

8. The method of claim 5, in which $k \in -1, 0, 1$.

9. The method of claim 5, in which $k \in -2, -1, 0, 1, 2$.

10. The method of claim 1, in which the wrapped-phase hidden Markov model is a univariate model $f_x(x)$, and further comprising:

taking a product of the univariate model for each dimension i according to:

$$f_x(x) = \prod_i f_x(x_i)$$

to represent the univariate model as a multivariate model.

11. The method of claim 1, further comprising:

determining a posteriori probabilities of the wrapped-phase hidden Markov model.

12. The method of claim 1, in which the phase differences are determined for a predetermined frequency range.

13. The method of claim 1, in which the constructing is performed using supervised training.

14. The method of claim 1, in which the constructing is performed using unsupervised training using k-means clustering, and the likelihoods are distances.

15. A system for modeling trajectories of a signal source, comprising:

an array of sensors configured to acquire training signals generated by a signal source moving along a plurality of known trajectories;

means for determining phase differences between all unique pairs of the training signals; and means for constructing a wrapped-phase hidden Markov model from the phase differences, the wrapped-phase hidden Markov model including a plurality of Gaussian distributions to model the plurality of known trajectories of the signal source.

16. The system of claim 15, in which test signals generated by the signal source moving along an unknown trajectory are acquired, and further comprising:

means for determining phase differences between all pairs of test signals; and means for determining, according to the wrapped-phase hidden Markov model and the phase differences of the test signal, a likelihood that the unknown trajectory is similar to one of the plurality of known trajectories.

* * * * *